Aug. 16, 1932.  J. C. ZEDER  1,872,547

BRAKE SHOE

Filed Nov. 9, 1929

INVENTOR
JAMES C. ZEDER.
BY
ATTORNEY

Patented Aug. 16, 1932

1,872,547

UNITED STATES PATENT OFFICE

JAMES C. ZEDER, OF DETROIT, MICHIGAN, ASSIGNOR TO CHRYSLER CORPORATION, OF DETROIT, MICHIGAN, A CORPORATION OF DELAWARE

BRAKE SHOE

Application filed November 9, 1929. Serial No. 405,899.

This invention relates to brake shoes and is illustrated as embodied in a pressed metal brake shoe for an internal expanding automobile brake.

An object of the invention is to provide an inexpensive means for securing the friction material to the metal shoe.

Another object of the invention is to resiliently secure the friction material to the shoe so that the friction material may readily adjust itself to the inner periphery of a brake drum when the outer periphery of the shoe is out of line with the inner periphery of the brake drum. Preferably the shoe is made of two parts secured together by the friction material vulcanized to each of the two parts, thus permitting relative torsional movement between the two parts.

Other objects and advantages of the invention will more fully appear from the following description taken in connection with the accompanying drawing, in which.

Figure 1:
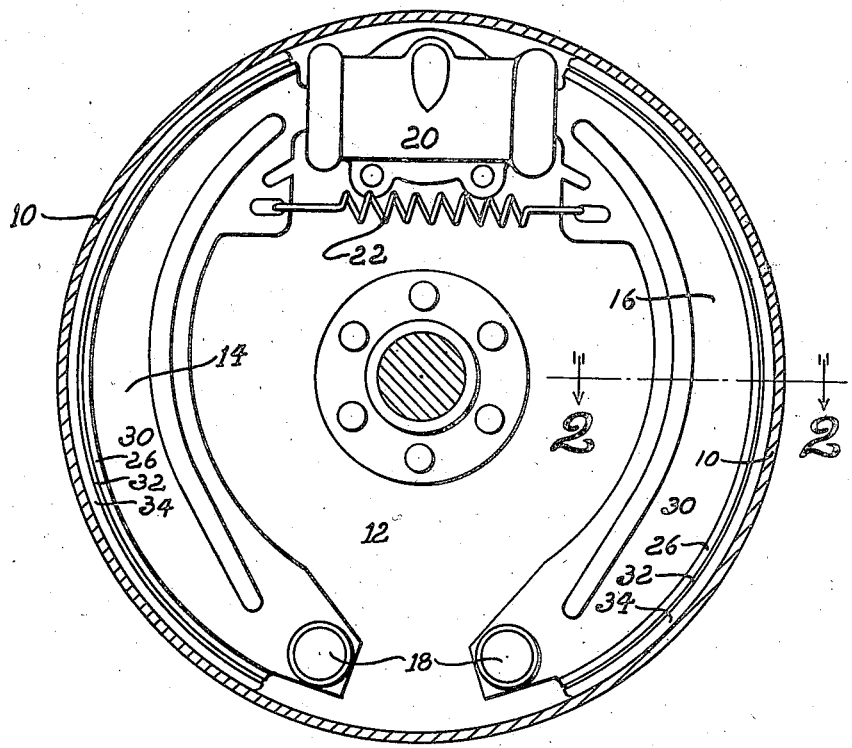
Fig. 1 is a vertical section through a brake drum just inside the head of the brake drum, showing the shoes in side elevation.
Figure 2:
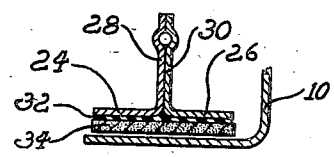
Fig. 2 is a sectional view on line 2—2 of Fig. 1.

The illustrated shoes are intended for use in a brake of the hydraulic type, shown in Fig. 1, including a brake drum 10. At the open side of the brake drum 10 there may be arranged a backing plate 12 or other suitable support and within which are arranged two brake shoes 14 and 16. The shoes are pivoted as at 18 to the backing plate 12 and are adapted to be forced outwardly into frictional engagement with the drum 10 by pistons, not shown, reciprocating in a double hydraulic cylinder 20. A spring 22 having its opposite ends connected to the brake shoes returns the shoes to their normal positions.

The particular shoe selected for illustration includes two stampings generally L shaped in cross section, having cylindrical flanges 24 and 26 extending away from each other forming a two part supporting face for the friction material. Adjacent radial flanges 28 and 30 form a stiffening web. These radial flanges may be secured together such as by welding or riveting, but I prefer to secure the L shaped stampings together by the friction material bonded to the outer surfaces of the flanges 24 and 26.

In the preferred embodiment of my invention, the L shaped stampings are arranged back to back and a coating of rubber, shown at 32, is vulcanized to the outer surfaces of the flanges 24 and 26, resiliently securing them together. A friction material 34 is vulcanized to the outer surface of the rubber. The friction material may be glued or otherwise bonded directly to the outer surfaces of flanges 24 and 26 and the rubber omitted.

It will be understood that the L shaped members are relatively movable and that one portion of the friction material securing face may move independent of the other portion to compensate for any irregularity in the brake drum.

Various changes, including the size, shape and arrangement of parts, may be made without departing from the spirit of my invention and it is not my intention to limit its scope other than by the terms of the appended claims.

What I claim is:

1. A brake shoe having two members with substantially semi-circular faces arranged side by side, a resilient connection between said members on the semi-circular faces, and friction material on said resilient connection.

2. A brake shoe having two members with substantially semi-circular faces arranged side by side, a rubber coating on said faces forming the sole connection there between, and friction material on said rubber coating.

3. A brake shoe having two members with substantially semi-circular faces arranged side by side, a rubber coating vulcanized to the faces forming the sole connection there between, and friction material vulcanized to said rubber coating.

JAMES C. ZEDER.